(12) United States Patent
Bohn et al.

(10) Patent No.: US 6,584,301 B1
(45) Date of Patent: Jun. 24, 2003

(54) INDUCTIVE READER DEVICE AND METHOD WITH INTEGRATED ANTENNA AND SIGNAL COUPLER

(75) Inventors: Thomas B. Bohn, McHenry, IL (US); Richard S. Rachwalski, Lemont, IL (US); Mark A. Schamberger, South Elgin, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/578,433

(22) Filed: May 25, 2000

(51) Int. Cl.[7] .............................. H04B 5/00; H04Q 5/22
(52) U.S. Cl. ........................ 455/41; 455/106; 340/10.1
(58) Field of Search ............................ 455/41, 73, 106, 455/101; 235/375–386; 342/42–51; 340/825.25, 825.54, 825.31, 825.33, 870.28, 870.31, 870.33, 10.1, 10.2, 10.3

(56) References Cited

U.S. PATENT DOCUMENTS

| | | | | |
|---|---|---|---|---|
| 4,922,261 A | * | 5/1990 | O'Farrell | 343/742 |
| 5,084,699 A | * | 1/1992 | DeMichele | 340/825.54 |
| 5,266,926 A | * | 11/1993 | Beigel | 340/572 |
| 5,317,330 A | * | 5/1994 | Everett et al. | 343/867 |
| 6,124,803 A | * | 9/2000 | Hamma | 340/825.52 |

* cited by examiner

Primary Examiner—Duc Nguyen
(74) Attorney, Agent, or Firm—K. Cyrus Khosravi; Valerie M. Davis

(57) ABSTRACT

An inductive reader device (104) communicates with a transponder (102) using electromagnetic coupling. The reader device includes a transmitter (112), a receiver (114), a first coil element (116), and a second coil element (118). The first coil element is directly connected to the transmitter to emit a radio frequency excitation signal. The first coil element receives a radio frequency response signal from the transponder via electromagnetic coupling. The second coil element is directly connected to the receiver to provide a response signal to the receiver. The second coil element is loosely or inductively coupled to the first coil element via a predetermined mutual inductance due to the spatial relationship between the first coil element and the second coil element. Hence, the second coil element receives the radio frequency response signal from the first coil element. Advantageously, a signal coupler required for the receiver is integrated with an antenna element by virtue of the second coil element.

39 Claims, 2 Drawing Sheets

INDUCTIVE READER DEVICE AND METHOD WITH INTEGRATED ANTENNA AND SIGNAL COUPLER

FIELD OF THE INVENTION

The present invention relates generally to inductive reader devices for use with contactless smartcards, radio frequency identification devices and other transponders, and in particular to an inductive reader device with an integrated antenna and signal coupler.

BACKGROUND OF THE INVENTION

Inductive reader devices are known for use with transponders, such as contactless smartcards and radio frequency identification devices. In radio frequency communication systems employing readers and transponders, the reader typically provides a radio frequency excitation signal. When a transponder is brought in close proximity to the reader device, electromagnetic coupling via the excitation signal powers the transponder and enables the transponder to generate a radio frequency response signal. This response signal is electromagnetically coupled to the reader. A data signal from the transponder included in the response signal is received by the reader and used for processing.

FIG. 1 is a block diagram showing schematically a known inductive reader device 10. Reader device 10 includes a transmitter 12, a receiver 14 an antenna 16 and a transformer 18. Transmitter 12 generates a radio frequency excitation signal using a signal source 20, which is typically controlled by a control circuit and a modulator that modulate commands onto the excitation signal. Transmitter 12 is directly connected to antenna 16. Antenna 16 is a coil having a predetermined inductance. Antenna 16 is typically implemented as a coil etched on a printed circuit board. Antenna 16 is generally made to consume as large an area as available in order to improve electromagnetic coupling between the reader device 10 and a transponder. Antenna 16 is directly connected to transformer 18. Transformer 18 is a discrete component that is separate and apart from antenna 16. Transformer 18 is connected to receiver 14. Transformer 18 does not inductively couple to a transponder. Transformer 18 is used to electrically receive from antenna 16 a data component of the modulated response signal returned by a transponder. This signal is then received by the receiver 14, which is directly connected to the transformer 18. The received signal is used by the reader circuit in accordance with the application, for example, security identification, smartcard transactions, etc.

One problem with the reader device 10 shown in FIG. 1 is the use of the discrete transformer 18. Transformer 18 is physically large and consumes valuable printed circuit board area. Transformer 18 is relatively expensive as well. In addition, some discrete transformer components are prone to failure, impacting the reliability of the product. Also, the characteristics of the transformer are required to be matched to the antenna, which may require custom transformer components for some reader devices.

FIG. 2 shows a known reader device 50 that eliminates the need for a discrete transformer, such as transformer 18. Reader device 50 includes a transmitter 52, a receiver 54, a transmitter antenna 56 and a receiver antenna 58. Transmitter 52 generates an excitation signal that is emitted by transmitter antenna 56. Transmitter antenna 56 is a coil. Electromagnetic coupling is used to transmit the excitation signal to a transponder brought in close proximity to transmitter antenna 56. Rather than receiving the responsive signal from a transponder via the same antenna element, as is the case in reader device 10, the receiver antenna 58 is provided for coupling to the transponder to receive the responsive radio frequency signal. Receiver antenna 58 is directly connected to receiver 54 to transfer the received responsive signal to the receiver. As illustrated in FIG. 2, transmitter antenna 56 and receiver antenna 58 share an available antenna area 60. The antennas 56, 58 are implemented as traces in a printed circuit board. The antennas are electrically isolated. The antennas partially overlap each other for mutual flux cancellation, which is required to isolate the transmitter and the receiver for proper circuit operation. Since the antennas must overlap partially, the total antenna area cannot be used for any one antenna. Therefore the size of both antennas is compromised in comparison to the total available antenna area. The reduced antenna area reduces the operating range of the reader device. This may be undesirable, in particular, for small portable reader devices.

Therefore, a need exists for a cost effective reader device with minimal limitations on operating range due to antenna size.

DETAILED DESCRIPTION OF THE PREFERRED EMBODIMENTS

Briefly, an inductive reader device in accordance with the present invention includes a transmitter, a receiver, a first coil element and a second coil element. The first coil element is connected to the transmitter. The first coil element emits and receives radio frequency signals including a data signal from a transponder. Radio frequency signals from the transponder are electromagnetically coupled over the air to the first coil element. The second coil element is directly connected to the receiver and inductively coupled to the first coil element by proximate spacing to the first coil element. More specifically, the second coil element is sized substantially smaller than the first coil element and is selected to have a self-inductance and mutual inductance with the first coil element.

In another aspect of the present invention, a method is provided for communicating between a transponder and an inductive reader device. First, a first coil element connected to a transmitter of the inductive reader device is coupled with the transponder via inductive coupling. This typically entails bringing the transponder in close proximity to the reader. A radio frequency signal is produced by the transponder in response to the inductive coupling between the transponder and the first coil element. The radio frequency signal includes a data signal. A second coil element connected to a receiver of the inductive reader device is inductively coupled with the first coil element such that the second coil element receives a coupled signal from the first coil element and the receiver receives the coupled signal from the second coil element. The coupled signal includes the data signal from the transponder.

By virtue of the inductive coupling between the first coil element and the second coil element, a signal received from the transponder via the first coil element is made available to the receiver via the second coil element. Preferably, the first coil element and the second coil element are both implemented as traces on a printed circuit board with the second coil element located within the interior area of the first coil element to provide a predetermined mutual coupling between the first coil element and the second coil element. The second coil element advantageously eliminates the need for a discrete transformer to serve as a signal coupler for the receiver.

Figure 1:
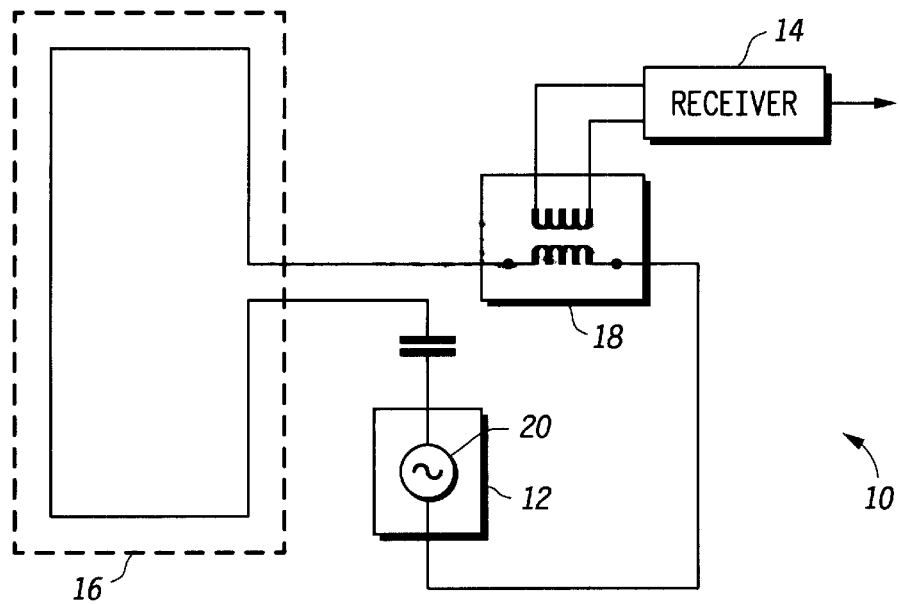
FIG. 1 is a schematic block diagram showing a prior art reader device that requires a discrete transformer for coupling a responsive signal from a transponder to a receiver.
Figure 2:
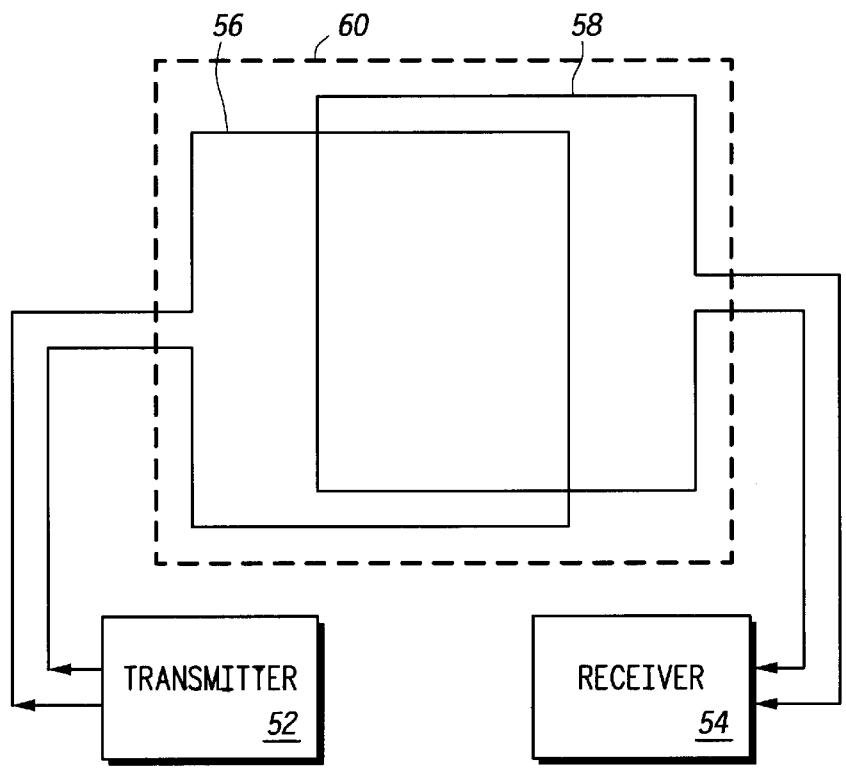
FIG. 2 is a schematic block diagram of a prior art reader device that uses two isolated antennas to separately transmit and receive radio frequency signals.
Figure 3:
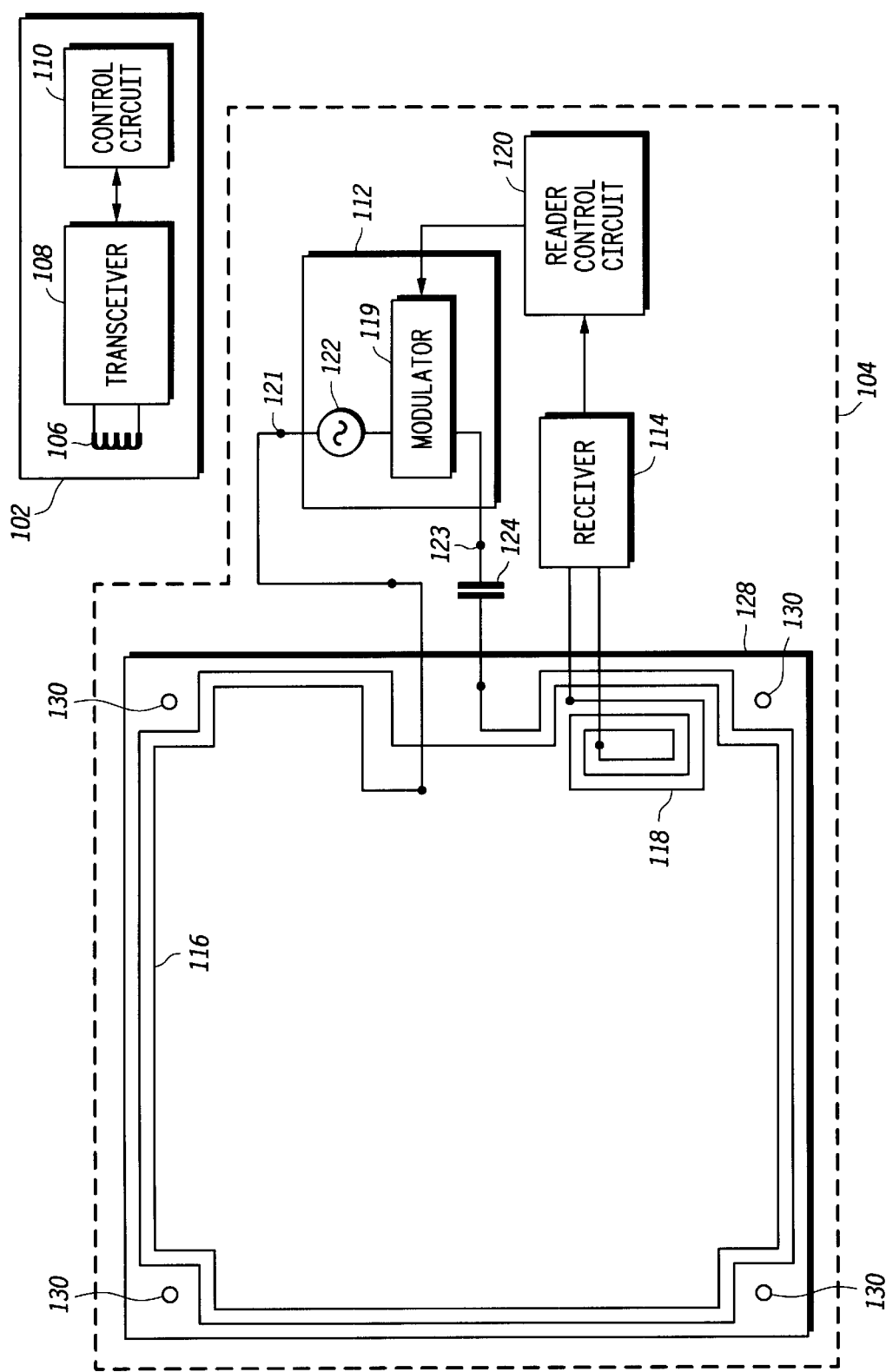
FIG. 3 is a schematic block diagram of a reader device in accordance with the present invention including an integrated antenna and signal coupler.

FIG. 3 is a block diagram of a radio frequency communication system 100 in accordance with the present invention. System 100 includes a transponder 102 and a reader device 104. Reader device 104 and transponder 102 communicate over the air with each other when placed in close proximity to each other. More specifically, reader device 104 produces a radio frequency excitation signal that is electromagnetically coupled to transponder 102. In response to the excitation signal, transponder 102 is energized to transmit a responsive radio frequency signal.

Transponder 102 includes a coil element 106, a transceiver 108, and a control circuit 110. Coil element 106 serves as an antenna for receiving the excitation signal and emitting the responsive signal. Transceiver 108 includes a transmitter for transmitting or modulating a response signal and a receiver for receiving an excitation signal, which may or may not include data. Control circuit 110 determines the data to be supplied in the response signal as well as the actions to be taken in response to the excitation signal. Control circuit 110 varies according to the application for transponder 102. Preferably, transponder 102 is a smartcard or radio frequency identification device.

Reader device 104 includes a transmitter 112, a receiver 114, a first coil element 116, a second coil element 118 and a reader control circuit 120. Transmitter 112 generates an excitation signal under control of reader control circuit 120. Transmitter 112 is directly connected to first coil element 116. More specifically, first coil element 116 is preferably directly connected to transmitter 112 at a first terminal 121 and is preferably capacitively coupled to transmitter 112 at a second terminal 123. Capacitor 124 couples the transmitter 112 to the first coil element 116 at second terminal 123 and is selected to resonate with the inductance of the coil element at the operating frequency of the communication system.

First coil element 116 serves as an antenna for emitting and receiving radio frequency signals. More specifically, first coil element 116 emits an excitation signal generated by transmitter 112 and receives a responsive signal from a transponder. A second coil element 118 is directly connected to receiver 114. Second coil element 118 supplies the responsive signal to receiver 114. In accordance with the present invention, second coil element 118 serves as a signal coupler to supply the responsive signal from a transponder to receiver 114. More specifically, second coil element 118 is placed in spatial relationship to first coil element 116 such that a predetermined intentional mutual inductance between first coil element 116 and second coil element 118 permits a responsive signal to be coupled to receiver 114. Control circuit 120 receives the data in the responsive signal from receiver 114.

As shown schematically in FIG. 3, first coil element 116 and second coil element 118 are implemented as traces on printed circuit board 128. Printed circuit board 128 defines an available area for an antenna. To maximize system operating range, first coil element 116 is etched in printed circuit board 128 to maximize the size of first coil element 116 in relation to the available antenna area. First coil element 116 is routed substantially around the perimeter of printed circuit board 128. The perimeter of printed circuit board 128 has a generally rectangular or square configuration. Similarly, first coil element 116 has a generally rectangular configuration. Mounting holes 130, which are used to mount printed circuit board 128 to another printed circuit board comprising the reader, prevent the first coil element 116 from being more rectangular. First coil element 116 alternatively has a circular, oval or other configuration, typically conforming to a shape of the housing for the coil element.

Second coil element 118 is substantially smaller than first coil element 116. This, in part, prevents second coil element 118 from substantially coupling with transponder 102. Second coil element 118 is placed in close proximity to first coil element 116 to form a transformer. To minimize the size of second coil element 118 and maintain adequate coupling to the first coil element, second coil element 118 is configured near a corner of first coil element 116. Second coil element 118 is preferably placed in the same plane of the printed circuit board as first coil element 116. Second coil element 118 preferably has a generally rectangular configuration. Alternatively, second coil element 118 has a circular, oval or other configuration.

First coil element 116 is shown in FIG. 3 as a coil with two turns. Second coil element 118 is a coil with three turns. The number and configuration of turns will vary in part with an inductance required for operation of the reader.

In the preferred embodiment shown in FIG. 3, first coil element 116 and second coil element 118 are etched in a printed circuit board. As an alternative embodiment, first coil element 116 and second coil element 118 are implemented as coiled wire in a nonconductive material or substrate. Alternatively, first coil element 116 and second coil element 118 are implemented by any suitable conductive material arranged in a coil, for example, conductive ink or insulated wire.

Transmitter 112, receiver 114 and reader control circuit 120 are selected based on the application for reader device 104. Reader control circuit 120 is preferably microprocessor based. Reader control circuit 120 generates data that modulates transmitter 112 for a read/write system. For a read-only system, reader control circuit 120 need not generate a modulated (i.e., with data or a write command) signal to the transponder. Transmitter 112 preferably includes an oscillator 122 for generating the radio frequency excitation signal and a modulator 119, where required, for modulating the radio frequency excitation signal. Receiver 114 preferably receives and demodulates a data signal included in a responsive signal received by second coil element 118 due to its inductive coupling with first coil element 116.

In operation, transmitter 112 generates a radio frequency excitation signal under control of reader control circuit 120. The excitation signal is emitted by first coil element 116. When a transponder, such as transponder 102 is brought in close proximity to reader device 104, transponder 102 receives the excitation signal. More specifically, coil element 106 receives the excitation signal and uses the energy of the excitation signal to power circuitry on transponder 102. The control circuit then drives transceiver 108 to emit an appropriate response signal. In a preferred embodiment, the response signal is a modulated version of the excitation signal. The response signal emitted by transponder 102 is received by first coil element 116. Due to the size of second coil element 118, there is no substantial coupling of second coil element 118 with transponder 102. However, mutual inductance caused by the spatial relationship between first coil element 116 and second coil element 118 induces in second coil element 118 a signal that includes the response signal from transponder 102. This responsive signal is made available at the input of receiver 114, permitting receiver 114 to receive and demodulate data associated with the responsive signal. This data is transferred to the reader control circuit 120 for operation in accordance with the application implemented by reader device 104.

Disclosed herein is an inductive reader device with an integrated antenna and signal coupler. The inductive reader device does not require a discrete transformer component directly coupled to the main antenna. Rather, a second coil element is integrated in the antenna element space to form an integrated transformer to couple a responsive signal from a transponder to a receiver in the reader. The second coil element utilizes printed circuit board space that was otherwise unused and frees up space occupied by the discrete transformer device.

The invention being thus described, it will be evident that the same may be varied in many ways. Such variations are not to be regarded as a departure from the spirit and scope of the invention and all such modifications are intended to be included within the scope of the claims.

What is claimed is:

1. An inductive reader device comprising:
    a transmitter;
    a receiver;
    a first coil element connected to the transmitter, wherein the first coil element emits and receives radio frequency signals via inductive coupling to a transponder, the radio frequency signals including a data signal from the transponder; and
    a second coil element connected to the receiver and inductively coupled to the first coil element such that the receiver receives from the second coil element via the first coil element the data signal from the transponder.

2. The device of claim 1 wherein the second coil element is spaced in relation to the first coil element to provide a predetermined mutual inductive coupling between the first coil element and the second coil element.

3. The device of claim 2 wherein the first coil element is substantially larger than the second coil element.

4. The device of claim 1 wherein the first coil element and the second coil element are both traces on a printed circuit board.

5. The device of claim 4 wherein the first coil element forms a generally rectangular configuration and the second coil element forms a generally rectangular configuration.

6. The device of claim 5 wherein the second coil element is placed near a corner of the generally rectangular configuration of the first coil element.

7. The device of claim 4 wherein the first coil element forms a generally circular configuration and the second coil element forms a generally circular configuration.

8. The device of claim 1 wherein the first coil element and the second coil element are both coils of wire.

9. The device of claim 1 wherein the first coil element and the second coil element are both coils of wire affixed in a non-conductive material.

10. The device of claim 1 wherein the first coil element is at least one of a printed circuit board trace, conductive ink, and a wire and wherein the second coil element is at least one of a printed circuit board trace, conductive ink, and a wire.

11. A radio frequency communications system comprising:
    a transponder; and
    a reader device, the reader device comprising:
        a transmitter;
        a receiver;
        a first coil element connected to the transmitter; wherein the first coil element emits and receives radio frequency signals via inductive coupling to the transponder, the radio frequency signals including a data signal from the transponder; and
        a second coil element connected to the receiver and inductively coupled to the first coil element such that the receiver receives from the second coil element via the first coil element the data signal from the transponder.

12. The system of claim 11 wherein the second coil element is spaced in relation to the first coil element to provide a predetermined mutual inductive coupling between the first coil element and the second coil element.

13. The system of claim 12 wherein the first coil element is substantially larger than the second coil element.

14. The system of claim 11 wherein the first coil element and the second coil element are both traces on a printed circuit board.

15. The system of claim 14 wherein the first coil element forms a generally rectangular configuration and the second coil element forms a generally rectangular configuration.

16. The system of claim 15 wherein the second coil element is placed near a corner of the generally rectangular configuration of the first coil element.

17. The system of claim 11 wherein the first coil element is at least one of wire, a trace on a printed circuit board, and conductive ink and wherein the second coil element is at least one of wire, a trace on a printed circuit board, and conductive ink.

18. The system of claim 11 wherein the transponder comprises:
    a coil that receives radio frequency signals;
    a transceiver connected to the coil to receive radio frequency signals from the coil; and
    a control circuit coupled to the transceiver to control the data signal from the transponder.

19. An inductive reader device comprising:
    a transmitter;
    a receiver;
    a first coil element connected to the transmitter; wherein the first coil element emits and receives radio frequency signals via inductive coupling to a transponder, the radio frequency signals including a data signal from the transponder; and
    a second coil element connected to the receiver and inductively coupled to the first coil element such that the second coil element receives a coupled signal from the first coil element and the receiver receives the coupled signal from the second coil element, the coupled signal including the data signal from the transponder.

20. The device of claim 19 wherein the second coil element is spaced in relation to the first coil element to provide a predetermined mutual inductive coupling between the first coil element and the second coil element.

21. The device of claim 20 wherein the first coil element is substantially larger than the second coil element.

22. The device of claim 19 wherein the first coil element and the second coil element are both traces on a printed circuit board.

23. The device of claim 22 wherein the first coil element forms a generally rectangular configuration and the second coil element forms a generally rectangular configuration.

24. The device of claim 23 wherein the second coil element is placed near a corner of the generally rectangular configuration of the first coil element.

25. The device of claim 22 wherein the first coil element forms a generally circular configuration and the second coil element forms a generally circular configuration.

26. The device of claim 19 wherein the first coil element and the second coil element are both coils of wire.

27. The device of claim 19 wherein the first coil element and the second coil element are both coils of wire affixed in a non-conductive material.

28. The device of claim 19 wherein the first coil element is at least one of wire, a trace on a printed circuit board, and conductive ink and wherein the second coil element is at least one of a printed circuit board trace, conductive ink, and a wire.

29. A method for communicating between an inductive reader device and a transponder, the method comprising the steps of:
  A) coupling a first coil element connected to a transmitter of the inductive reader device with the transponder via inductive coupling;
  B) receiving a radio frequency signal produced by the transponder in response to inductive coupling between the transponder and the first coil element, the radio frequency signal including a data signal; and
  C) inductively coupling a second coil element connected to a receiver of the inductive reader device with the first coil element such that the second coil element receives a coupled signal from the first coil element and the receiver receives the coupled signal from the second coil element, the coupled signal including the data signal from the transponder.

30. The method of claim 29 wherein the second coil element is spaced in relation to the first coil element to provide a predetermined mutual inductive coupling between the first coil element and the second coil element.

31. The method of claim 30 wherein the first coil element is substantially larger than the second coil element.

32. The method of claim 29 wherein the first coil element and the second coil element are both traces on a printed circuit board.

33. The method of claim 32 wherein the first coil element forms a generally rectangular configuration and the second coil element forms a generally rectangular configuration.

34. The method of claim 33 wherein the second coil element is placed near a corner of the generally rectangular configuration of the first coil element.

35. The method of claim 32 wherein the first coil element forms a generally circular configuration and the second coil element forms a generally circular configuration.

36. The method of claim 29 wherein the first coil element and the second coil element are both coils of wire.

37. The method of claim 29 wherein the first coil element and the second coil element are both coils of wire affixed in a non-conductive material.

38. The method of claim 29 wherein the first coil element is at least one of wire, a trace on a printed circuit board, and conductive ink and wherein the second coil element is at least one of a printed circuit board trace, conductive ink, and a wire.

39. The method of claim 29 wherein step A further comprises:
  A1) the inductive reader device emitting an excitation signal; and
  A2) the excitation signal energizing the transponder to produce the radio frequency signal.

* * * * *